(12) United States Patent
Horvat

(10) Patent No.: US 8,444,321 B2
(45) Date of Patent: May 21, 2013

(54) BEARING ANTI CREEP DEVICE AND METHOD

(76) Inventor: John Horvat, Smithville (CA)

( * ) Notice: Subject to any disclaimer, the term of this patent is extended or adjusted under 35 U.S.C. 154(b) by 0 days.

(21) Appl. No.: 13/329,876

(22) Filed: Dec. 19, 2011

(65) Prior Publication Data

US 2012/0093453 A1 Apr. 19, 2012

Related U.S. Application Data

(62) Division of application No. 12/213,302, filed on Jun. 18, 2008, now Pat. No. 8,177,436.

(51) Int. Cl.
*F16C 29/10* (2006.01)
*F16C 35/06* (2006.01)
*F16C 29/04* (2006.01)

(52) U.S. Cl.
USPC ............ 384/537; 384/513; 384/543; 384/906

(58) Field of Classification Search
USPC ........... 384/21, 203, 206, 211–212, 490–491, 384/539, 540, 543, 548, 587, 906
See application file for complete search history.

(56) References Cited

U.S. PATENT DOCUMENTS

| | | | | |
|---|---|---|---|---|
| 3,669,519 A | * | 6/1972 | Takahashi et al. | 384/539 |
| 4,511,191 A | * | 4/1985 | Kitamura | 384/536 |
| 4,699,530 A | * | 10/1987 | Satoh et al. | 384/609 |
| 5,282,510 A | * | 2/1994 | Pacher | 173/48 |
| 5,564,839 A | * | 10/1996 | Ouchi et al. | 384/448 |
| 5,961,222 A | * | 10/1999 | Yabe et al. | 384/476 |
| 5,975,764 A | * | 11/1999 | Okada et al. | 384/493 |
| 6,199,539 B1 | * | 3/2001 | Pearlman et al. | 123/470 |
| 6,604,389 B2 | * | 8/2003 | Skvarla et al. | 68/23.6 |
| 7,140,817 B1 | * | 11/2006 | Phillips et al. | 409/182 |
| 7,736,064 B2 | * | 6/2010 | Kusano et al. | 384/537 |
| 2007/0147717 A1 | * | 6/2007 | Kusano et al. | 384/127 |

FOREIGN PATENT DOCUMENTS

| | | | | |
|---|---|---|---|---|
| JP | 06294417 A | * | 10/1994 | |
| JP | 06346925 A | * | 12/1994 | |
| JP | 09004643 A | * | 1/1997 | |
| JP | 09014275 A | * | 1/1997 | |
| JP | 2006234097 A | * | 9/2006 | |

* cited by examiner

*Primary Examiner* — Marcus Charles

(57) ABSTRACT

The present invention is an anti rotational creep bearing including a socket designed in the inner race of the bearing for partially receiving an anti creep ball therein, further including a shaft onto which the bearing is to be longitudinally mounted, including a channel defined along a longitudinal direction for receiving there along the anti creep ball projecting from its socket, wherein the depth of the socket plus the depth of the channel is at least equal to the diameter of the anti creep ball, such that when the bearing is installed on the shaft, the anti creep ball prevents creep in the rotational direction, however allows movement in the axial direction.

3 Claims, 7 Drawing Sheets

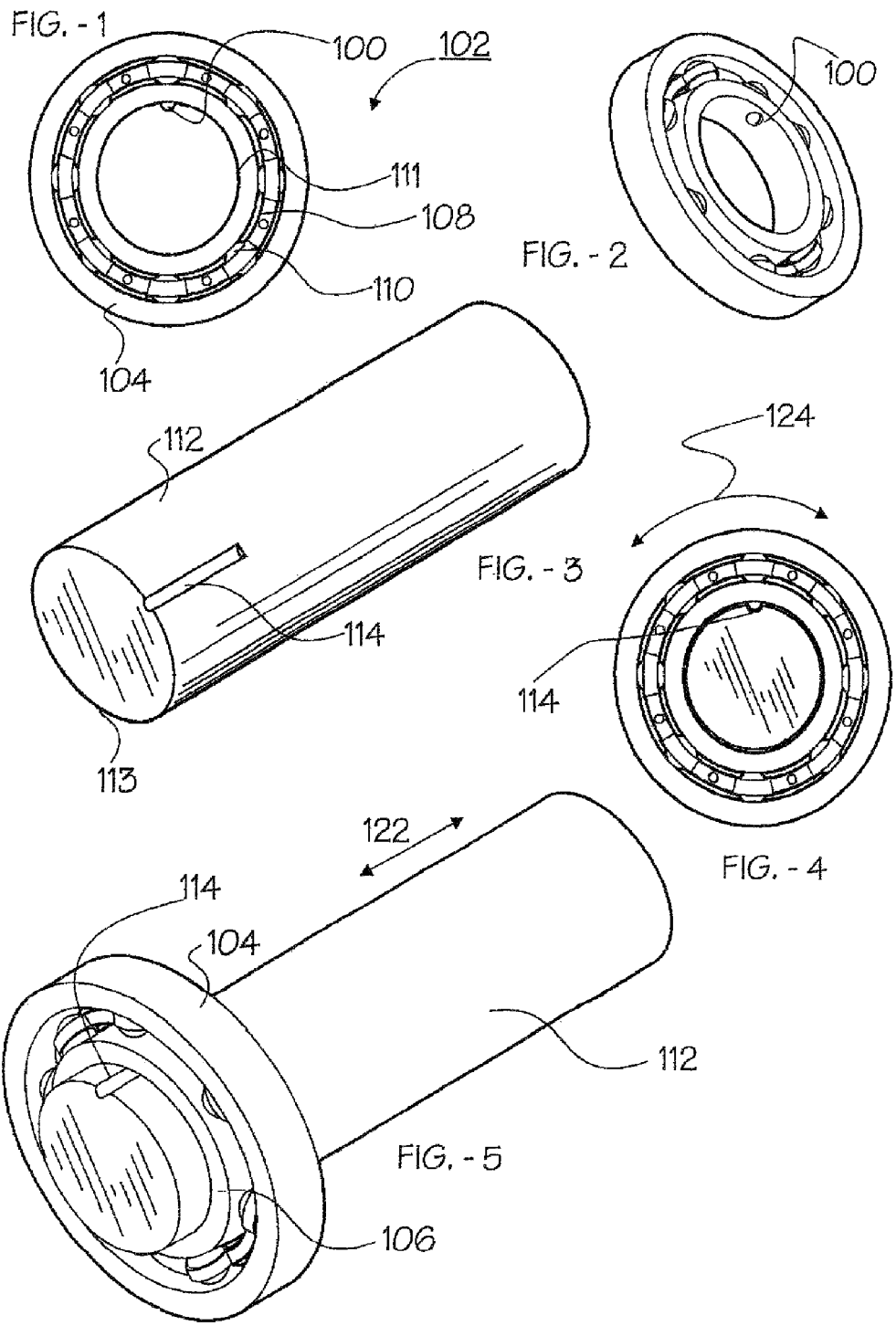

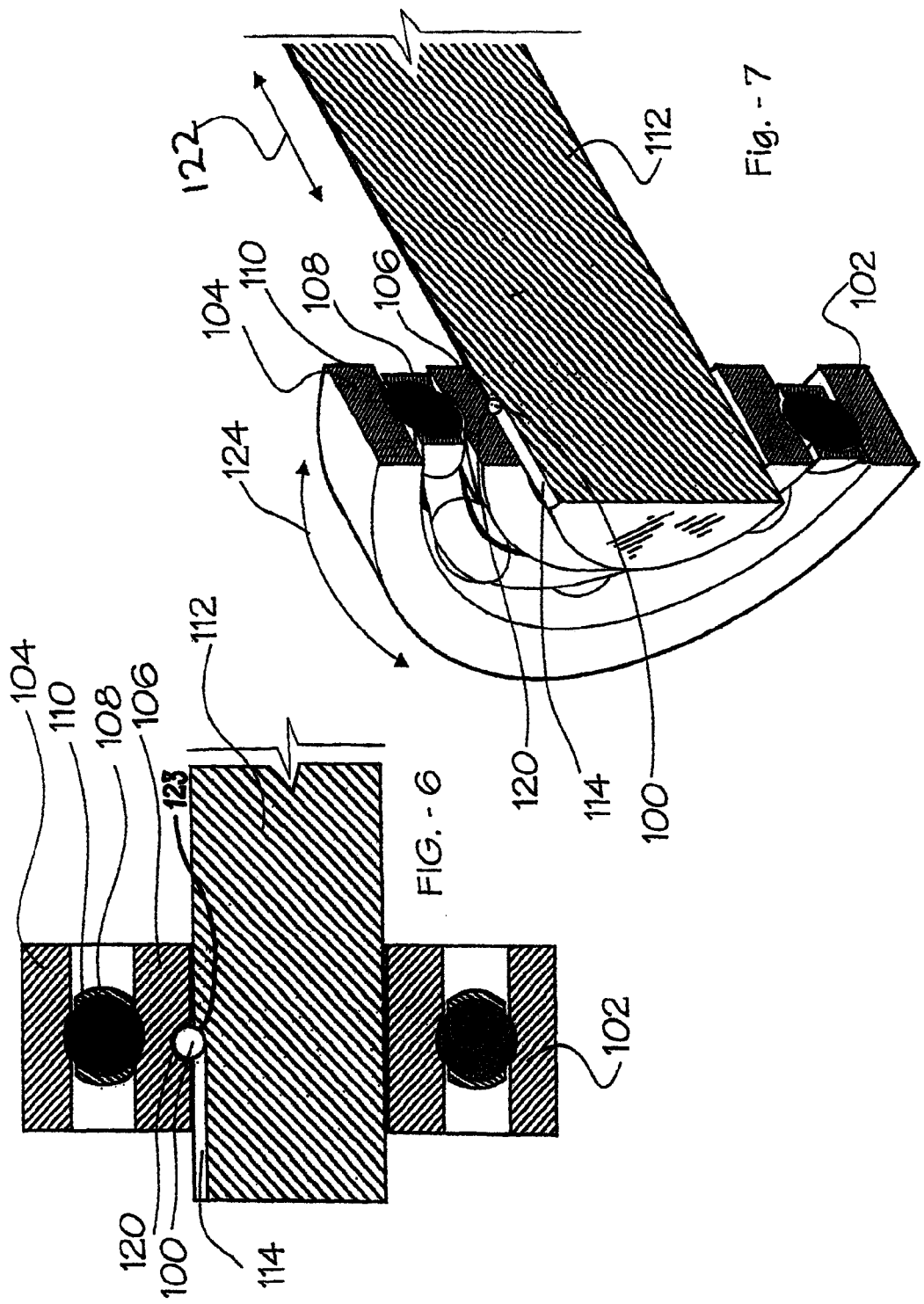

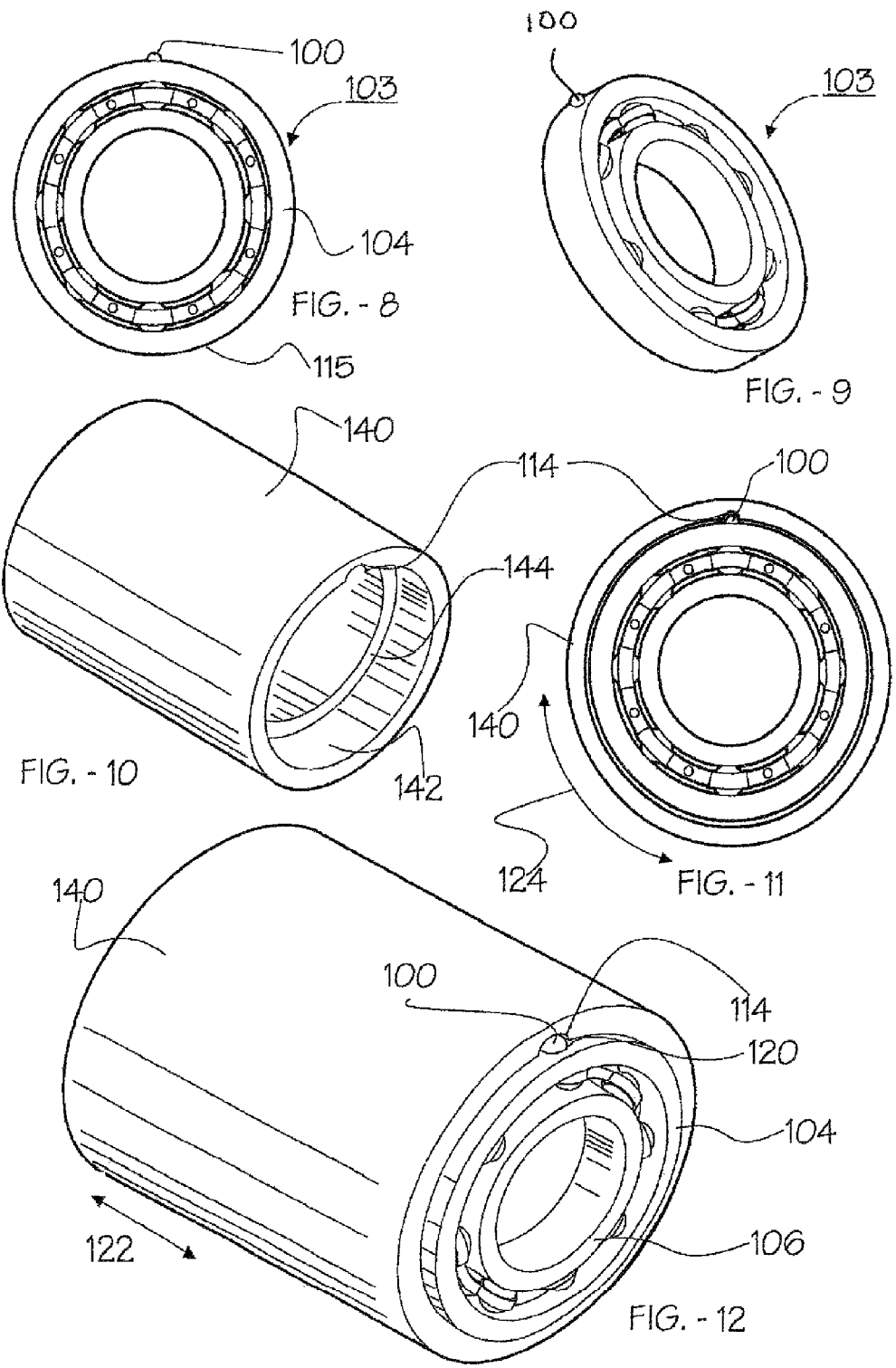

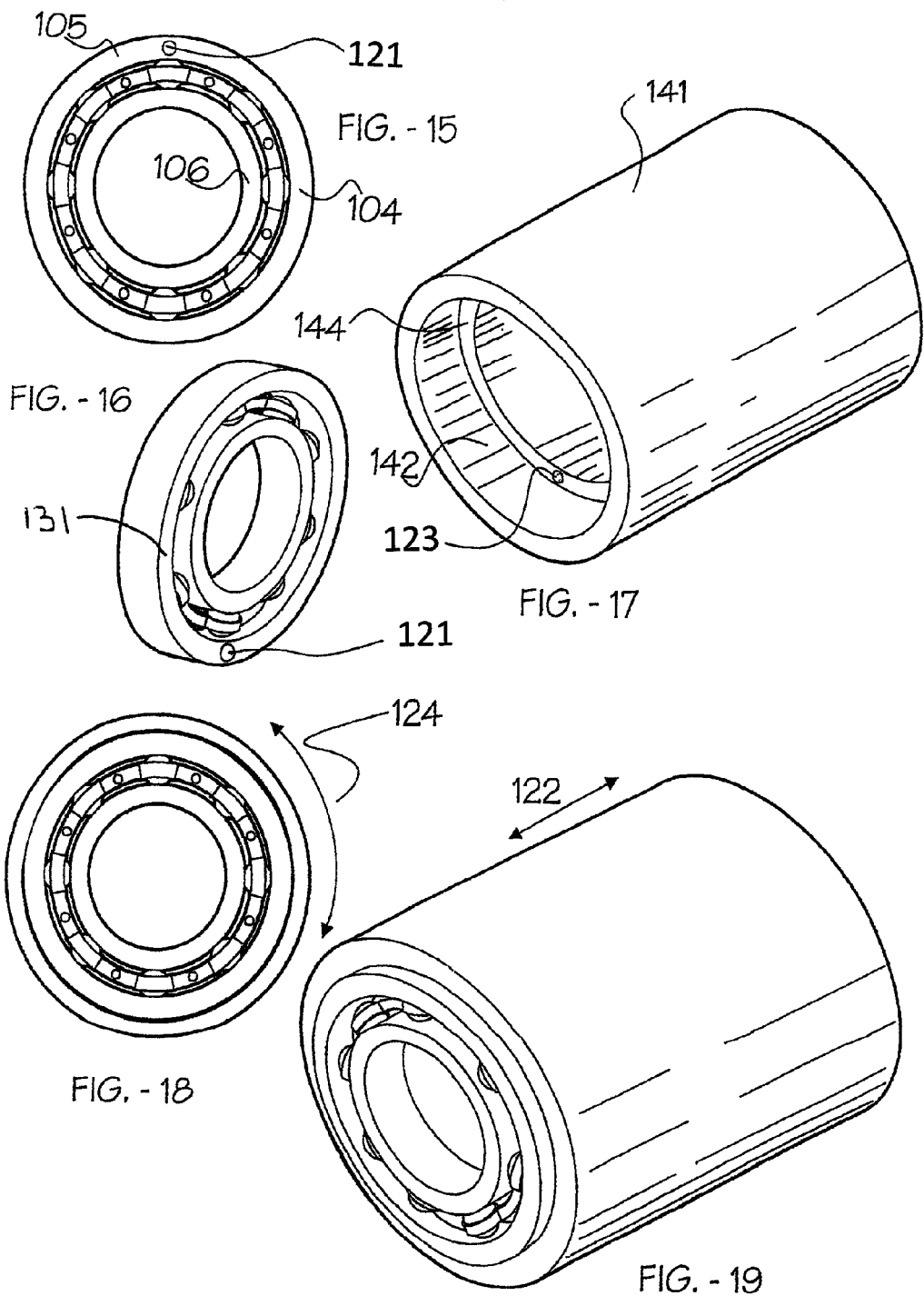

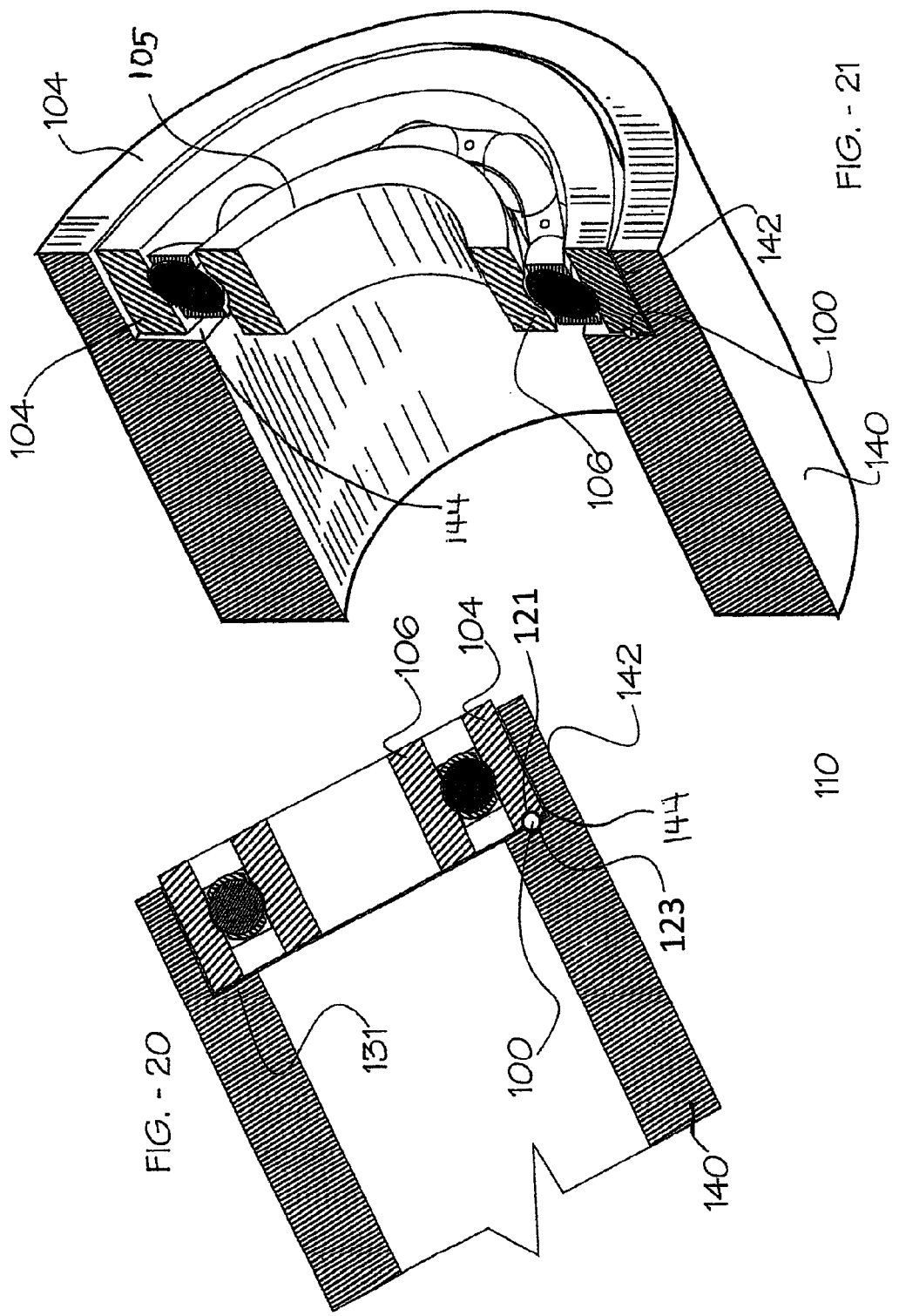

BEARING ANTI CREEP DEVICE AND METHOD

THE CROSS REFERENCE TO RELATED APPLICATIONS

The application is a division of U.S. Utility Patent Application No. 12/213,302, filed on Jun. 18, 2008, which is a National Stage filing based upon PCT Application No. PCT/CA2007/000008, filed on Jan. 4, 2007, which claims priority from previously filed U.S. Provisional Patent Application No. 60/766,600, titled "BEARING ANTI CREEP DEVICE & METHOD", filed on Jan. 31, 2006 by John Horvat.

FIELD OF THE INVENTION

This invention relates to anti creep devices for ball bearings and more particularly relates to a bearing anti creep device, system and a method of employing the device.

BACKGROUND OF THE INVENTION

Typically a ball bearing, needle bearing or other types of bearings are mounted onto a shaft and also another object in order to permit rotation of the shaft relative to the object. Typically, the inner race of a bearing is pressed onto a shaft and the outer race of the bearing is pressed into a bearing seat defined within a housing. Due to longitudinal or axial thermal expansions and contractions of the shaft and/or the housing into which the bearing is seated, there must be made allowance for axial movement of the bearing relative to the shaft and/or relative to the housing. In order to provide for this longitudinal or axial movement, the bearing mounting must be loose enough to accommodate longitudinal or axial movement of the bearing. Upon rotation and loading of the bearing, the outer bearing and/or the inner bearing race may rotationally creep. For example the inner bearing race may creep (move) rotational on the outer diameter of the shaft causing abrasion, wear, distortion and/or fretting corrosion along the bearing seat contact surface.

This rotational creep is undesirable due to the damage that it can impart upon either the bearing, the housing that the bearing is mounted into and/or the shaft that the bearing is mounted onto.

The damage imparted by the rotational creep may become so extensive, that repair must be initiated which often can be expensive and require additional machining of housings and/or shafts and replacement of bearings which creates down time of the machine and therefore lost production to the manufacturing operation.

BRIEF SUMMARY OF THE INVENTION

Therefore, it is desirable to have a device and/or a method for prevention of rotational creep in order to ensure that the outer race and the inner race do not move rotationally relative to the bearing.

BRIEF DESCRIPTION OF THE DRAWINGS

The invention will now be described by way of example only with reference to the following drawings:

FIG. 1 a side elevational view of a ball bearing together with an anti creep ball mounted in the inner race.

FIG. 2 is a front perspective view of a ball bearing with an anti creep ball mounted in the inner race.

FIG. 3 is a top schematic perspective view of a shaft showing a channel defined therein.

FIG. 4 is a front elevational view of a ball bearing mounted on a shaft together with an anti creep ball mounted on the inner race.

FIG. 5 is a front perspective view of a shaft having a ball bearing mounted thereon on one end together with a channel defined in one end.

FIG. 6 is a schematic cross sectional view of the arrangement shown in FIG. 5 showing a ball bearing mounted onto a shaft together with the anti creep ball.

FIG. 7 is a partial cut away schematic perspective view of the arrangement shown in FIG. 5 showing a ball bearing mounted onto a shaft together with the anti creep ball.

FIG. 8 is a front perspective view of a ball bearing showing an anti creep ball mounted in the outer race.

FIG. 9 is a schematic perspective view of the bearing shown in FIG. 8 with an anti creep ball shown mounted in the outer race.

FIG. 10 is a front perspective view of a housing showing a channel defined therein.

FIG. 11 is a front plan view of a bearing mounted into the bearing seat of a housing together with the anti creep ball mounted therein.

FIG. 12 is a front perspective view of the assembly shown in FIG. 11.

FIG. 15 is a front plan view of a ball bearing showing a socket defined in a bearing face.

FIG. 16 is a schematic perspective view of a ball bearing shown with a socket defined in a bearing face.

FIG. 17 is a front schematic perspective view of a housing shown together with a socket defined in a shoulder of the housing.

FIG. 18 is a front elevational view of the assembled bearing and housing;

FIG. 19 is a front perspective view of the device shown in FIG. 18.

FIG. 20 is a cross sectional view of the assembly shown in FIGS. 18 and 19 in which a ball bearing is shown mounted in a bearing seat abutting a shoulder shown together with an anti creep ball.

FIG. 21 is a partial cut away perspective view of the arrangement shown in FIG. 20.

DETAILED DESCRIPTION OF THE PREFERRED EMBODIMENT

Figure 13:
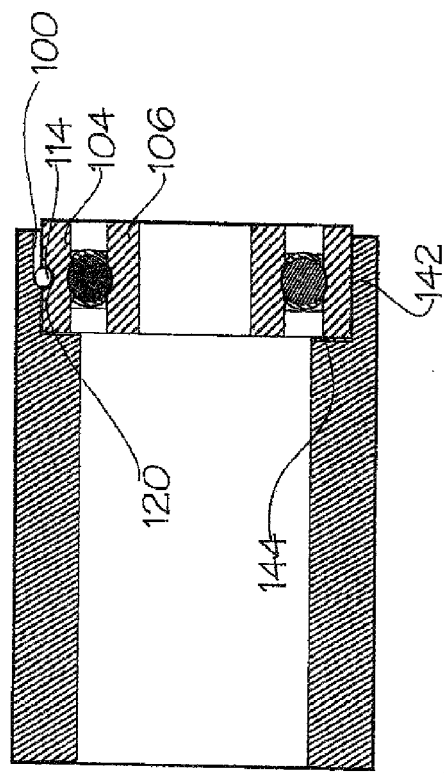
FIG. 13 is a cross sectional view of the assembly shown in FIG. 12 in which a ball bearing is mounted onto a bearing seat defined in a housing together with a anti creep ball.

The first embodiment of the present invention is depicted in FIGS. 1 through 7 inclusively. FIG. 1 shows a ball bearing 102 which includes an outer race 104 and inner race 106, bearing cage 108 having ball bearings 110 therein. Ball bearing 102 also includes an anti creep ball 100 shown mounted in the inner diameter 111 of the inner race 106 of ball bearing 102. FIG. 2 a perspective schematic view of ball bearing 102 shows anti creep ball 100, located roughly mid way across the width of the inner diameter 111 of the inner race 106.

FIG. 3 shows a shaft 112 having a channel 114 defined therein. Figuresr4 and 5 show a ball bearing 102 mounted on shaft 112. Typically a bearing such as ball bearing 102 is either slideably received onto shaft 112 in the longitudinal direction 122 and/or is pressed onto the end of shaft 112 in the longitudinal direction 122 due to a friction fit between the inner race 106 and the outer diameter 113 of shaft 112. Anti creep ball 100 registers with longitudinal channel 114 as ball bearing 102 is pushed longitudinally over shaft 112 into the installed position as shown in FIG. 5. Referring now to FIGS. 6 and 7 which schematically show in cross section along the longitudinal direction 122, ball bearing 102 mounted onto shaft 112. Anti creep ball 100 is preferably a small ball bearing which is seated in a socket 120 defined in inner race 106 of ball bearing 102. Socket 120 is also referred to as first socket through out this specification. A second socket 123 is preferably a channel 114 which is preferably a semi circular shaped groove adapted to receive therein substantially one half of the anti creep ball. The depth of socket 120 is approximately ½ of the diameter of anti creep ball 100 and therefore the depth of channel 114 is also approximately ½ the diameter of anti creep ball 100. In order to assemble ball bearing 102 onto shaft 112, anti creep ball 100 is mounted into socket 120 and held in place with a small amount of grease for example. Thereafter, ball bearing 102 with anti creep ball 100 mounted in socket 120 can be slideably fit over the end of shaft 112 provided that anti creep ball 100 registers and travels along channel 114 during the assembly procedure along longitudinal direction 122. Person skilled in the art will recognize that there must be sufficient clearance between anti creep ball 100 and channel 114 to allow assembly. A person skilled in the art will note that the inclusion of anti creep ball 100 will prevent rotation of the inner race 106 in rotational direction 124 relative to shaft 112 due to the locking function of anti creep ball 100 which is simultaneously mounted in socket 120 and also channel 114. The use of anti creep ball 100 allows ball bearing 102 to move in the longitudinal direction 122, however prevents bearing creep in the rotational direction 124 shown in FIG. 4.

Figure 14:
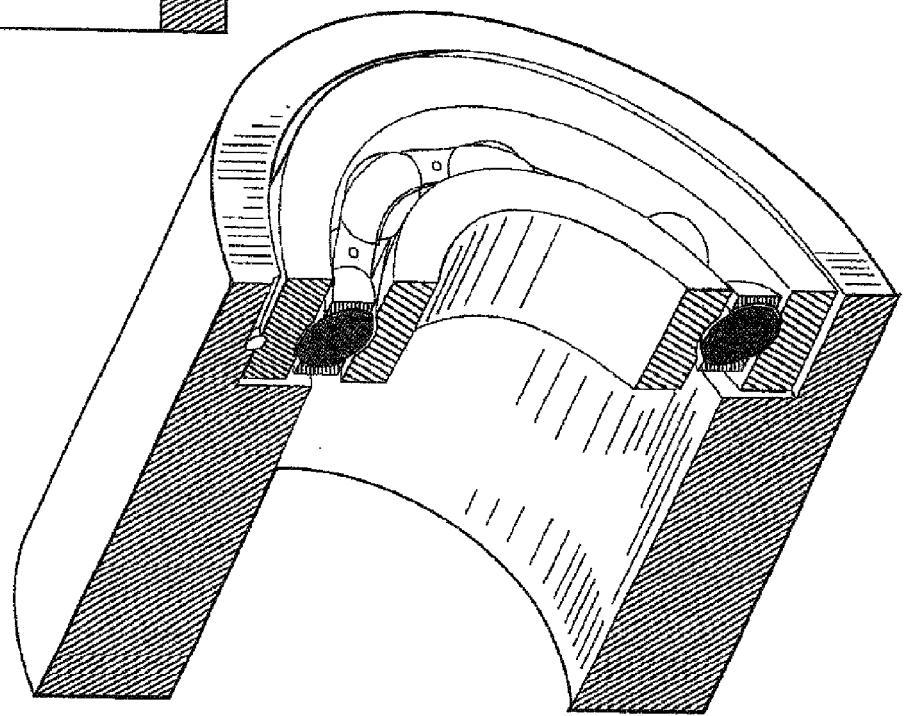
FIG. 14 is a front partial cut away perspective view of the arrangement shown in FIG. 13.

FIGS. 8 through 14 show a second embodiment of the present invention. Ball bearing 103 depicted in FIGS. 8 and 9 shows a anti creep ball 100 mounted in the outer diameter 115 of the outer race 104 of ball bearing 103. In this application, ball bearing 103 is mounted into a housing 140 having a bearing seat 142, a shoulder 144 and a channel 114. Shown in assembled position in FIGS. 11 and 12, ball bearing 103 is slideably mounted onto bearing seat 142 by slideably urging ball bearing 103 in the longitudinal direction 122 onto bearing seat 142 until it is flush with shoulder 144 defined in housing 140. FIGS. 13 and 14 show schematically in partial cross section view the mounting of ball bearing 103 into housing 140. Ball Bearing 103 is slideably urged in longitudinal direction 122 into bearing seat 142 by aligning and registering anti creep ball 100 with channel 114 in order to install ball bearing 103 into housing 140. In similar fashion as the previous embodiment, anti creep ball 100 is located simultaneously in a socket 120 and also in a channel 114. Socket 120 has a depth approximately ½ the diameter of anti creep ball 100 and channel 114 has a depth again of approximately ½ the diameter of anti creep ball 100. Therefore, ball bearing 103 is free to move in the longitudinal direction 122, however will prevent rotational creep in rotation direction 124.

The third embodiment of the present invention is depicted in FIGS. 15 through 21 in which ball bearing 105 includes a socket 120 defined in the bearing face 131 of the outer race 104. A housing 141 having a shoulder 144 and a bearing seat 142 has defined on the shoulder 144 a first socket 121. First socket 121 is a spherical dome adapted to receive up to one half of the anti creep ball. As best shown in cross sectional view as in FIGS. 20 and 21, the depth of second socket 123 defined in shoulder 144 is approximately ½ of the diameter of anti creep ball 100 and the first socket 121 defined in the outer race 104 of bearing 105, also has a depth of approximately ½ of anti creep ball 100. Therefore, bearing 105 can move freely in the longitudinal direction 122 for installation purposes. To install ball bearing 105 is urged longitudinally along bearing seat 142 until outer race 104 of ball bearing 105 abuts with shoulder 144 of bearing seat 142. In order for outer face 131 of outer race 104 of ball bearing 105 to make contact with shoulder 144, second socket 123 defined in shoulder 144 and first socket 121 defined in outer race 104 must align and register in order to accommodate therein anti creep ball 100. Additionally a retaining device is used to fix ball bearing 105 into bearing seat 142 thereby minimizing longitudinal movement of ball bearing 105. The retaining device not shown could be a circlip, retaining plate, or any other means to fix ball bearing 105 into bearing seat 142. A person skilled in the art will recognize that a shaft passing through inner race 106 can move longitudinally relative to ball bearing 105.

Inner diameter 111, outer diameter 115, and bearing face 131 are examples of bearing mounting surfaces. A mounting surface may be any surface of a bearing used to hold the bearing in place. Shoulder 144, bearing seat 142 shaft outer diameter 113, are examples of mating surfaces used to mate with a mounting surface to hold a bearing in place.

A person skilled in the art will note that ball bearing 102 and 103 are examples of how the anti creep ball could be installed in typical installations. The reader will note that the anti creep ball and this method of preventing rotation of creep can be applied to needle bearings, thrust bearings, roller bearings and/or any other type of bearing which is subject to rotational creep. The reader will also note that this method and device for preventing rotational creep allows for movement of the bearing in the longitudinal direction 122, however prevents movement of the bearing in the rotational direction 124, namely rotational creep relative to the bearing seat and/or the shaft.

Therefore, a person skilled in the art will note that ball bearing 102 and 103 is free to move in the longitudinal direction 122; however the presence of anti creep ball 100 and the first and second sockets 121 and 123 will prevent rotational creep.

Figure 22:
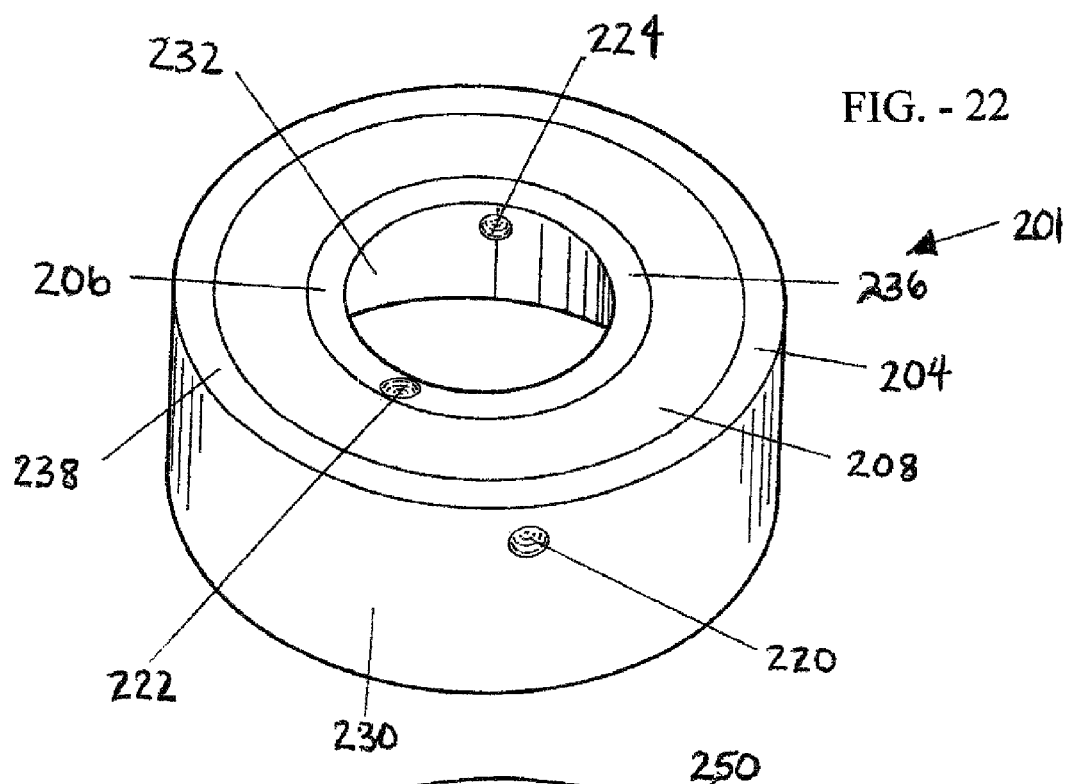
FIG. 22 is a schematic top perspective view of yet alternate ball bearing showing three different socket locations.
Figure 23:
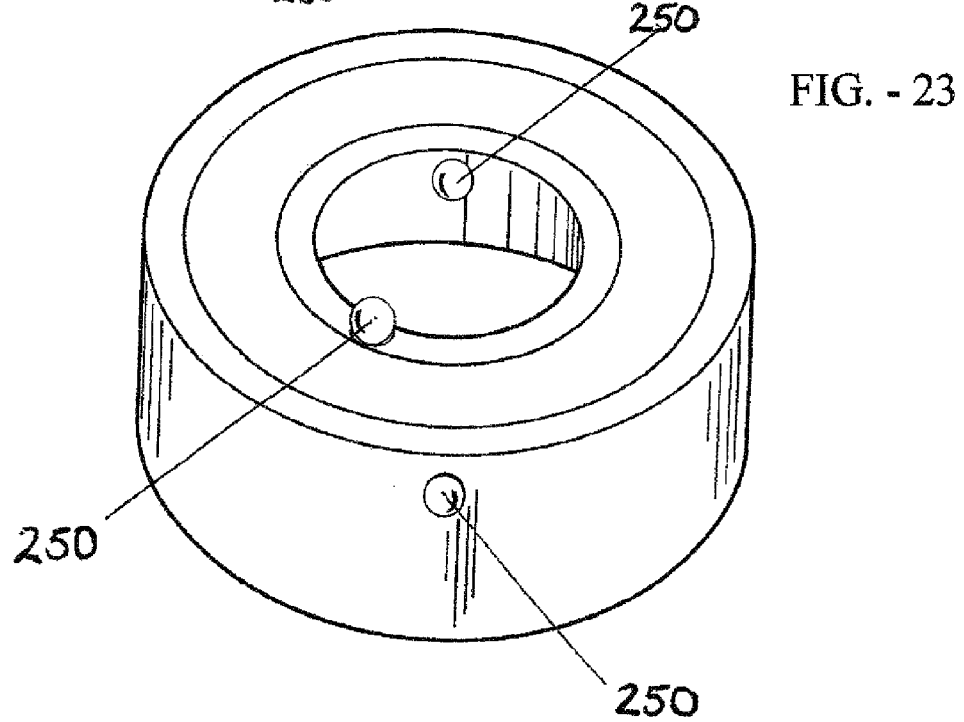
FIG. 23 is a schematic top perspective view of the ball bearing shown in FIG. 22 with the anti creep balls shown installed in the sockets.

Referring now to FIGS. 22 and 23 which depict ball bearing 201 having three distinct sockets defined at different locations of the bearing namely, socket 220 on outer diameter 230, socket 222 defined on the inner radial face 236 of inner race 206 and socket 224 defined in inner diameter 232 of inner race 206. This particular ball bearing 201 is shown with a dust cover 208 which covers up the bearing cage and the ball bearings which are located under the dust cover 208. Ball bearing 201 includes an outer race 204, having an outer diameter 230 and an outer radial face 238. Socket 220 is defined in the outer diameter 230 of outer race 204. Ball bearing 201 further includes an inner race 206 which has an inner radial face 236 and also an inner diameter 232. Socket 222 is defined in inner radial face 236 of inner race 206. Socket 224 is defined in inner diameter 232 of inner race 206.

A person skilled in the art will note that sockets 220, 222 and 224 are dimensioned to accept approximately ½ of anti creep ball 250 therein.

Ball bearing 201 is an example of how a bearing could be arranged to include sockets in various locations of the bearing in order that one is able to use an anti creep ball 250 with the ball bearing in any one of the configurations as shown in the previous embodiments.

The reader will also note that a ball bearing could be manufactured with no sockets from the original equipment manufacturer, in which case one would have to retrofit the existing bearing with a socket. One could also manufacture the ball bearings with one and/or more sockets already in place from the manufacturer thereby making it simpler to take advantage of the use of anti creep ball 250.

What is claimed is:

1. A bearing anti creep system comprising:
   a) an anti creep ball;
   b) a first socket defined in a mounting surface of a bearing for partially receiving the anti creep ball therein;
   c) a second socket is defined in a mating surface, the second socket for partially receiving the anti creep ball therein;
   d) such that when said mounting surface of the bearing mounted onto the mating surface and the anti creep ball mounted simultaneously in adjacent first and second sockets, the anti creep ball prevents rotational creep of the bearing mounting surface relative to the mating surface, wherein the mounting surface is a bearing face of an outer race of the bearing.

2. The bearing anti creep system claimed in claim 1 wherein the mounting surface is a bearing face of an inner race of the bearing.

3. The bearing anti creep system claimed in claim 1 wherein the mating surface is a shoulder defined in a housing for receiving the bearing therein.

\* \* \* \* \*